United States Patent
Arimura

(10) Patent No.: US 7,732,077 B2
(45) Date of Patent: Jun. 8, 2010

(54) POLYMER ELECTROLYTE MEDIUM AND DIRECT METHANOL FUEL CELL

(75) Inventor: Tomoaki Arimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1157 days.

(21) Appl. No.: 11/349,252

(22) Filed: Feb. 8, 2006

(65) Prior Publication Data

US 2006/0177721 A1 Aug. 10, 2006

(30) Foreign Application Priority Data

Feb. 10, 2005 (JP) ............................. 2005-034486

(51) Int. Cl.
*H01M 8/08* (2006.01)
*H01M 8/10* (2006.01)
*H01M 8/14* (2006.01)

(52) U.S. Cl. ............................. 429/33; 429/30; 429/46

(58) Field of Classification Search ............... 429/33, 429/46

See application file for complete search history.

(56) References Cited

U.S. PATENT DOCUMENTS

| | | | | |
|---|---|---|---|---|
| 4,770,667 | A | * | 9/1988 | Evans et al. ................ 8/128.1 |
| 6,264,857 | B1 | | 7/2001 | Kreuer et al. |
| 6,723,757 | B1 | | 4/2004 | Kerres et al. |
| 2002/0094466 | A1 | | 7/2002 | Kerres et al. |

FOREIGN PATENT DOCUMENTS

| | | |
|---|---|---|
| JP | 2003-36864 | 2/2003 |
| WO | WO 01/84657 A2 | 11/2001 |
| WO | WO 01/94450 A2 | 12/2001 |
| WO | WO 03/062493 A1 | 7/2003 |

OTHER PUBLICATIONS

European Search Report issued by the European Patent Office dated Apr. 25, 2006, for European Application No. 06100820.7.

* cited by examiner

*Primary Examiner*—Dah-Wei D Yuan
*Assistant Examiner*—Steven Scully
(74) *Attorney, Agent, or Firm*—Finnegan, Henderson, Farabow, Garrett & Dunner, L.L.P.

(57) ABSTRACT

According to one embodiment, a polymer electrolyte medium is represented by the following general formula (I)

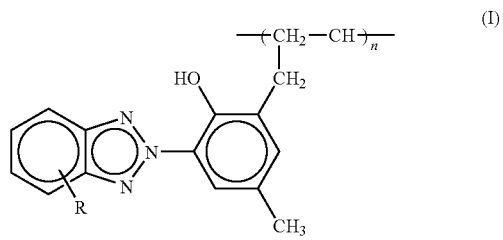

where R is sulfonic acid or phosphoric acid, and n is an integer from 1 to 8000.

5 Claims, 2 Drawing Sheets

POLYMER ELECTROLYTE MEDIUM AND DIRECT METHANOL FUEL CELL

CROSS-REFERENCE TO RELATED APPLICATIONS

This application is based upon and claims the benefit of priority from Japanese Patent Application No. 2005-034486, filed Feb. 10, 2005, the entire contents of which are incorporated herein by reference.

BACKGROUND

1. Field

One embodiment of the invention relates to a polymer electrolyte medium and a direct methanol fuel cell.

2. Description of the Related Art

As a polymer electrolyte medium (proton conductive membrane) of a direct methanol fuel cell (DMFC), hitherto, a perfluoroalkyl sulfonic acid membrane has been known, for example, Nafion (trademark, manufactured by DuPont), which is a fluorine system ion exchange membrane.

However, a conventional proton conductive membrane has a carbon fluoride structure in the main chain of its polymer structure, and has an affinity for methanol, and therefore, it is dissolved in a fuel cell during use and deteriorates. Further, the proton conductive membrane deteriorates because of radical seeds and the electric field caused by electrode reaction during operation of the fuel cell. Due to the deterioration of the proton conductive membrane by such factors, crossover of methanol takes place, and the efficiency of use of methanol declines. In addition, the output of the fuel cell is lowered. Moreover, since Nafion (trademark) is expensive, the cost of the fuel cell is increased.

On the other hand, Jpn. Pat. Appln. KOKAI Publication No. 2003-36864 discloses a solid polymer electrolyte membrane for a fuel cell composed of a copolymer of a fluorine carbide vinyl monomer and a hydrogen carbide vinyl monomer, including a main chain having a carbon fluoride structure and a hydrogen carbide side chain having a sulfonic group, with an alpha-methyl styrene group coupled to the side chain.

However, the solid polymer electrolyte membrane has a carbon fluoride structure in its main chain, and has an affinity for methanol. Therefore, it is dissolved in the fuel cell during use and deteriorates, and further deteriorates due to radical seeds and electric field caused by electrode reaction. As a result, crossover of methanol takes place, and the output of the fuel cell is lowered.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not limit the scope of the invention.

DETAILED DESCRIPTION

Various embodiments according to the invention will be described hereinafter with reference to the accompanying drawings.

In general, according to the invention, a polymer electrolyte medium of the embodiment is represented by the following general formula (I):

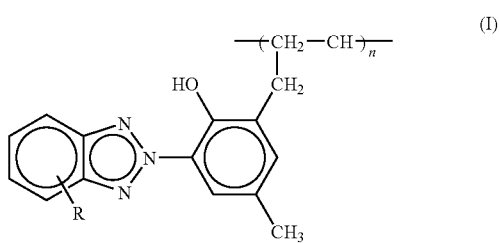

where R is sulfonic acid or phosphoric acid, and n is an integer from 1 to 8000.

In the above general formula (I), n is preferably from 50 to 8000, and more preferably from 300 to 4000.

The direct methanol fuel cell of the embodiment will be explained with reference to the accompanying drawings.

Figure 1:
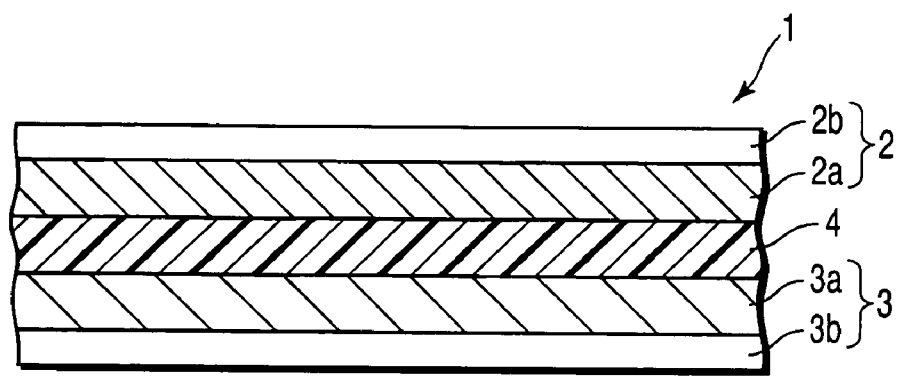
FIG. 1 is an exemplary view schematically showing a cell of an electromotive force unit of a direct methanol fuel cell according to an embodiment of the present invention.

FIG. 1 is an exemplary view schematically showing a cell of an electromotive force unit of the direct methanol fuel cell according to the embodiment. A single cell 1 is composed of an anode (fuel electrode) 2 to which an aqueous methanol solution is supplied, a cathode (air electrode) 3 to which an oxidizer (oxygen, air) is supplied, and a polymer electrolyte membrane 4 which is the polymer electrolyte medium in the general formula (I) interposed between the anode 2 and the cathode 3. The anode 2 includes a catalyst layer 2a which contacts with the polymer electrolyte membrane 4, and a diffusion layer 2b having, for example, a carbon paper laminated to the catalyst layer 2a. The cathode 3 includes a catalyst layer 3a which contacts with the polymer electrolyte membrane 4, and a diffusion layer 3b having, for example, a carbon paper laminated to the catalyst layer 3a.

The polymer electrolyte medium of the embodiment is represented by the general formula (I), and, unlike Nafion, does not contain carbon fluoride in the main chain or side chain thereof. Instead, a substituent phenyl group and benzotriazole are bonded to the main chain in this sequence, and the polymer electrolyte medium shows a high non-affinity (high resistance) for methanol. It is therefore hardly dissolved in methanol, and deterioration by methanol is prevented. When a cell of a fuel cell is composed by interposing the polymer electrolyte medium represented by the general formula (I) between the anode and the cathode, the substituent phenyl group and benzotriazole of the general formula (I) show a high resistance to radical seeds caused by electrode reaction during operation of the cell, and to the electric field caused by electrode reaction. Consequently, deterioration of the polymer electrolyte medium by the radical seeds and electric field can be prevented.

In the polymer electrolyte medium according to the embodiment, ionic sulfonic acid and phosphoric acid are bonded to benzotriazole as shown in the general formula (I), and thus, it shows equal or higher proton conductivity as compared with a perfluoroalkyl sulfonic acid membrane such as conventional Nafion.

Since the polymer electrolyte medium according to the embodiment has a structure as shown in the general formula (I), it is inexpensive compared with the perfluoroalkyl sulfonic acid membrane such as conventional Nafion.

The direct methanol fuel cell according to the embodiment has a single cell in which the excellent polymer electrolyte medium represented by the general formula (I) is interposed between the anode and the cathode. Therefore, methanol can be utilized efficiently by suppressing or preventing methanol crossover, a high output characteristic is maintained, and long-term reliability is assured when used for a long period.

Examples of the invention will be specifically described below.

Synthesis Example 1

In a 100 mL two-neck flask, a Dimroth condenser tube, an oil bath, a magnetic stirrer, an agitator, and a nitrogen balloon were installed. In the two-neck flask, 2-(3-allyl-2-hydroxy-5-methyl phenyl)-2-benzotriazole (molecular weight 265, 1.5 g, $5.67 \times 10^{-3}$ moles) was supplied, and 40 mL of tetrahydrofuran was further poured in as a solvent. The flask was put in an ice bath, and 0.3 mL of chlorosulfonic acid was added and stirred for 1 hour. The flask was put in the oil bath, 20 mg of benzoyl peroxide was added, the agitator was rotated at a speed of 200 rpm to agitate, and the oil bath temperature was set at 80° C. Agitation was stopped when elevation of viscosity of the reaction solution was observed. It was confirmed that the flask temperature was cooled to 30° C. or lower, the content of the flask was transferred into 100 mL of methanol, and a precipitate was formed.

The obtained precipitate was dispensed into two 100 mL centrifugal precipitation tubes, and centrifugally separated for 10 minutes at 3000 rpm. The supernatant was removed, a further 50 mL of water was added, and centrifugal separation operation was repeated three times. After centrifugal separation by using 50 mL of water, the water was replaced by acetone, the same operation was repeated, and a polymer was obtained by drying in air and drying in a vacuum.

The obtained polymer had the following structure (A). This structure (A) was identified from infrared spectral data obtained by the following infrared analysis.

<Infrared Spectral Data (Units: cm$^{-1}$)>
710, 745, 920, 1430, 1450, 1500 (—CH$_2$CH—CH$_2$),
740, 762 (N═C),
1205, 1385, 1465 (N—N),
2852, 2923, 2960 (CH$_3$),
3040 (aromatic),
3200 (OH),
780 (S—O).

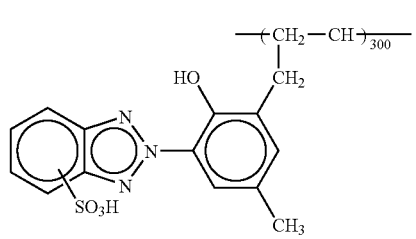

(A)

Synthesis Example 2

A polymer was synthesized in the same manner as in Synthesis Example 1, except that 2-chloro-1,3,2-dioxaphosphoran (C$_2$H$_4$ClO$_3$P; molecular weight 142, 0.90 g, $6.3 \times 10^{-3}$ moles) was used instead of the chlorosulfonic acid, and the reaction solution obtained by adding 80 mg of aluminum chloride, and adding a further 30 mL of 0.1N hydrochloric acid after reaction was agitated for 1 hour at room temperature by setting the agitator at a rotating speed of 200 rpm.

The obtained polymer had the following structure (B). This structure (B) was identified from infrared spectral data obtained by the following infrared analysis.

<Infrared Spectral Data (Units: cm$^{-1}$)>
710, 745, 920, 1430, 1450, 1500 (—CH$_2$CH—CH$_2$),
740, 762 (N═C),
1205, 1385, 1465 (N—N),
2862, 2923, 2960 (CH$_3$),
3040 (aromatic),
3200 (OH),
567, 857, 883, 986, 1115, 1146 (P—O).

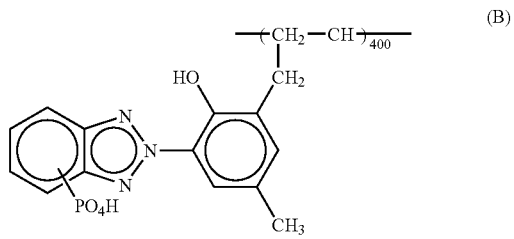

(B)

Examples 1 and 2

The polymers obtained in Synthesis Examples 1 and 2 were dissolved in 30 mL of N,N-dimethyl formamide, drawn into a glass plate by using a percolator, dried in air, and further dried in a vacuum for 4 hours. Obtained cast membranes (polymer electrolyte membranes) were peeled off by tweezers, and immersed and preserved in hydrochloric acid of 0.02 mole/L.

In the obtained cast membranes of Examples 1 and 2, the proton conductivity, radical resistance, methanol crossover, and pyrolysis property were evaluated in the following measurement methods.

1. Measurement of Proton Conductivity <Preparation of Cell for Measurement of Electrical Conductivity> a-1) Two fluorine resin plates were prepared, from polytetrafluoroethylene having a liquid sump penetrating in a size of 0.5 cm by 1.0 cm and 1.0 cm in depth in the center. A platinum foil of 0.30 mm in thickness was cut into a size of 0.5 cm×2.0 cm to obtain an electrode, and the electrode was affixed with double-sides adhesive tape so as to coincide precisely with the end side (0.5 cm) of the electrode of 0.5 cm side of the liquid sump of each of the fluorine resin plates. A protective tape was affixed to the electrode surface portion from the position apart by 0.7 cm from the end of the liquid sump to the other end, so that the electrode area was adjusted to 0.35 cm$^2$.

a-2) The surface of a platinum electrode was plated with platinum black in the following procedure. That is, in 30 mL of 1/40 N hydrochloric acid, 0.008 g of zinc acetate (Pb (CH$_3$COO)$_2$.3H$_2$O) and 1 g of platinum acid chloride ($H_2PtCl_6 \cdot 6H_2O$) were dissolved, and a plating solution was obtained. Each of the fluorine resin plates with a platinum electrode manufactured in a-1) was immersed in the plating solution, and a direct-current voltage and current generating apparatus (R1644, trade name, manufactured by Advantest Corporation) was set at a bath voltage of 3.0 V, current of 14 mA, and current density of 40 mA/cm$^2$. Approximately every minute, two electrodes of the apparatus were changed over by positive and negative setting switches, the polarity of two electrodes was changed over for 50 minutes consecutively, and plating was conducted gradually. Then, two electrodes were cleaned in distilled water. In 10% diluted sulfuric acid, the platinum black pole plate was set negative and the other new platinum pole plate was set positive, a voltage of 3 V was applied for 10 minutes, and a plating solution and adsorbed chlorine were removed. Finally, the electrodes were cleaned sufficiently in distilled water, and stored in distilled water.

b) The cast membranes of Examples 1 and 2 were cut into a size of 15 mm×12 mm, and used as measuring membranes for electric conductivity by an alternating-current method (call-call plot). Using the measuring membrane, a cell for measurement of electric conductivity was fabricated as shown in FIG. 2.

That is, a first fluorine resin plate 14a having holes 13a formed at four corners thereof, and having a liquid sump 15a in the center was prepared. On the first fluorine resin plate 14a, the platinum black plated portion 11a of the platinum electrode 12a fabricated in the method above was overlaid. The measuring membrane 16 was overlaid on the first fluorine resin plate 14a so as to cover the platinum black plated portion 11a including the liquid sump 15a. In contrast, a second fluorine resin plate 14b having holes 13b formed at the four corners thereof, and having a liquid sump 15b in the center was prepared. On the second fluorine resin plate 14b, the same platinum black plated portion (not shown) of the platinum electrode 12b was overlaid. The second fluorine resin plate 14b was overlaid on the first fluorine resin plate 14a such that the liquid sumps 15a, 15b coincided with each other. The measuring membrane 16 was enclosed by the first and second fluorine resin plates 14a, 14b. At this time, the first and second fluorine resin plates 14a, 14b were overlaid with each other, so that the platinum electrode 12b was extended in the opposite direction of the platinum electrode 12a of the first fluorine resin plate 14a, and its platinum black plated portion contacted with the measuring membrane 16. Subsequently, bolts (not shown) were inserted into the holes 13a, 13b opened at the four corners of the first and second fluorine resin plates 14a, 14b, nuts were put on these bolts, and the first and second fluorine resin plates 14a, 14b were fixed to each other. In the liquid sumps 15a, 15b of the first and second fluorine resin plates 14a, 14b, about 0.3 mL of a 0.03N aqueous hydrochloric acid solution was poured by capillary action, both sides of the measuring membrane 16 were entirely coated with the hydrochloric acid solution, and thereby a cell for measurement of electric conductivity was fabricated.

Figure 2:
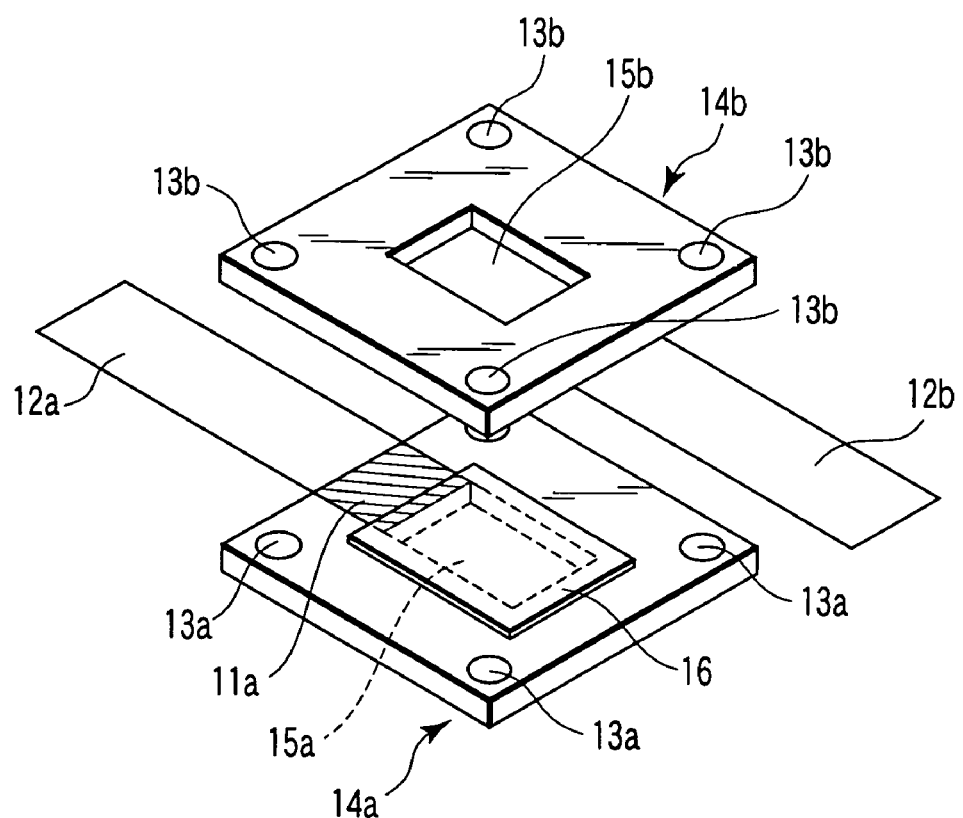
FIG. 2 is an exemplary exploded perspective view showing a cell for measuring electric conductivity used in Examples of the present invention.

Similarly, as Comparative Example 1, a Nafion 112 membrane (trademark, manufactured by DuPont) was cut into a size of 15 mm×12 mm, a measuring membrane for electric conductivity by alternating-current method (call-call plot) was prepared, and it was held between the first and second fluorine resin plates 14a, 14b as shown in FIG. 2. In addition, about 0.3 mL of a 0.03N aqueous hydrochloric acid solution was poured into the liquid sumps 15a, 15b, both sides of the measuring membrane 16 were entirely coated with the hydrochloric acid solution, and thereby a cell for measurement of electric conductivity was fabricated.

The obtained cell for measurement having a Nafion 112 membrane (trademark) as Comparative Example 1 was fixed on a stand, and a Solatron impedance/gain face analyzer SI1260 was connected to each platinum electrode. Alternating current was applied to the measuring membrane (Nafion membrane) while reducing the frequency of the current from the high frequency side to the low frequency side. The resistance at this time was plotted on real number axis and imaginary number axis (call-call plot). The obtained graph forms a semicircle at high frequency side, and become an upward sloping line at the low frequency side. The diameter of this semicircle represents the sample resistance. In this measurement, the radius of this semicircle was estimated, and from this value, Nafion membrane-H type electric conductivity was calculated, and membrane resistance was determined. The current flowing distance in the membrane is 0.5 cm as structurally specified. Therefore, the electric conductivity of membrane is obtained in the following formula (1).

$$\frac{\text{Proton conductivity}}{(W^{-1} \cdot cm^{-1})} = \text{distance between electrodes} / \begin{bmatrix} \text{membrane sectional area} \times \\ \text{membrane resistance} \end{bmatrix}$$

$$= 0.5 \,(cm) / [\text{membrane width } 1.0 \,(cm) \times$$

$$\text{membrane thickness (cm)} \times$$

$$\text{membrane resistance}(W)]$$

The proton conductivity when the Nafion 112 membrane was measured in this method was S0.

The cells for measurement having cast membranes of Examples 1, 2 were fixed on a stand, and a Solatron impedance/gain face analyzer SI1260 was connected to each platinum electrode. Alternating current was applied to the measuring membrane (cast membrane) while reducing the frequency of current from the high frequency side to the low frequency side. The proton conductivity of each cast membrane measured was S1, S2, and the relative ratio to proton conductivity S0 of the Nafion 112 membrane was determined as S1/S0, S2/S0. Results are shown in Table 1.

2. Measurement of Oxidative Decomposition Property (Radical Resistance)

A 100 mL beaker was fixed in an oil bath, and an oxidative aqueous solution (Fenton's reagent generating OH radicals) composed of hydrogen peroxide water 3% and $FeSO_4$ 40 ppm was poured into the beaker, and oil temperature was set to 60° C. A Nafion 112 membrane (trademark) was cut, a cut piece was weighed, and this weight was supposed to be W0. The cut sample of the Nation 112 membrane was put in the oxidative aqueous solution, and let stand for 10 hours. Later, the sample was lifted up, washed in water, dried in air, dried in vacuum, and weighed. This weight was W1. From these weights W0, W1, weight loss (WF0)=W0−W1 was determined. Weight loss by oxidative decomposition was used as an index of radical resistance.

In the cast membranes of Examples 1 and 2, similarly, the weight was measured before and after immersion in the oxidative solution, and weight loss (WF1, WF2) was determined. A relative ratio of the weight loss WF0 of the Nafion 112 membrane to the weight loss of the measured cast membranes was determined as WF0/WF1, WF0/WF2. Results are shown in Table 1.

3. Measurement of Methanol Crossover

A solid polymer electrolyte membrane was disposed and fixed between opening ends of two glass containers, and one container was filled with an aqueous methanol solution, and the methanol passing through the solid polymer electrolyte membrane to invade into the other container was measured by sampling gas in the other container, and traced by gas chromatograph analysis. The procedure is described below.

Two glass tubes were prepared, each in a cylindrical shape of 4 cm in inside diameter and 5 cm in length, sealed at one end, with a trench of 2 cm in width formed in the opening, and a hole of 6 mm in inside diameter opened in the shell (side).

A Nafion 112 membrane (trademark) was inserted in the opening ends of these glass tubes having trenches formed therein. One glass tube (first glass tube) was filled with an aqueous methanol solution at 3% concentration, and the hole having inside diameter of 6 mm at the side was filled with a silicone rubber stopper. The hole of the other glass tube (second glass tube) was also filled with a silicone rubber stopper, and a needle piercing a balloon was penetrated. The first and second glass tubes were set face to face across the Nafion 112 membrane, and the procedure started at 0 second. In every 20 minutes, a microsyringe was inserted into the silicone rubber stopper of the second glass tube, inside gas was collected by 20 microliters and measured by gas chromatograph, and methanol concentration (ppm) was determined. Plotting the time (minutes) on the axis of abscissas and the methanol concentration (ppm) on the axis of ordinates, the methanol concentration in 100 minutes was divided by the time, and methanol diffusion speed D0 (ppm/min) was obtained.

In the cast membranes of Examples 1, 2, methanol diffusion speeds D1 and D2 (ppm/min) were measured in the same method. The larger these values are, the larger cross-over of methanol becomes, and the characteristic of the solid polymer membrane for the fuel cell is lowered. Conversely, the smaller the values are, the lower methanol transmissivity is, and it is possible to maintain the oxidation reaction efficiency at the cathode side. Therefore, the power generation efficiency of the fuel cell in total can be improved. A relative ratio of the methanol diffusion speed of the Nafion 112 membrane to the methanol diffusion speed of the cast membranes measured was determined as D0/D1, D0/D2. Results are shown in Table 1.

4. Measurement of Pyrolysis Property

From a Nafion 112 membrane (trademark), 10 mg was sampled, and pyrolysis temperature in nitrogen gas was measured by using a TG-DTA apparatus (Thermo Plus 2, trademark, manufactured by Rigaku Corporation). At this time, temperature rise speed was 10° C./min. The measured pyrolysis temperature of the Nafion 112 membrane was supposed to be T0 (° C.).

From the cast membranes of Examples 1, 2, 10 mg each was sampled, and pyrolysis temperatures T1, T2 (° C.) were measured similarly. The higher the value is, the higher the heat resistance is, and it is favorable as characteristic of the solid polymer membrane for the fuel cell. A relative ratio of pyrolysis temperature of the Nafion 112 membrane to pyrolysis temperature of the cast membranes measured was determined as T1/T0, T2/T0. Results are shown in Table 1.

TABLE 1

| | Polymer electrolyte membrane | Proton conductivity (relative ratio) | Weight loss (resistance to oxidative decomposition) (relative ratio) | Methanol diffusion speed (relative ratio) | Pyrolysis temperature (relative ratio) |
|---|---|---|---|---|---|
| Example 1 | Structural formula A | 1.1 | 1.1 | 1.1 | 1.1 |
| Example 2 | Structural formula B | 1.2 | 1.2 | 1.2 | 1.2 |
| Comparative Example 1 | Nafion | 1.0 | 1.0 | 1.0 | 1.0 |

As clear from Table 1, the polymer electrolyte membranes of Examples 1 and 2 of the present invention are relatively large in proton conductivity as compared with the Nafion 112 membrane (trademark), show high proton conductivity, and are confirmed to be improved in proton conductivity.

The polymer electrolyte membranes of Examples 1 and 2 of the present invention are large in WF0/WF1, and WF0/WF2, that is, as compared with the Nafion 112 membrane (trademark), the weight loss is relatively small. Therefore, a high resistance to oxidative decomposition is known.

The polymer electrolyte membranes of Examples 1 and 2 of the present invention are large in D0/D1 and D0/D2, that is, as compared with the Nafion 112 membrane (trademark), the methanol diffusion speed is relatively small. Therefore, it is confirmed that suppressing effect of methanol cross-over is high.

The polymer electrolyte membranes of Examples 1 and 2 of the present invention are, as compared with the Nafion 112 membrane (trademark, manufactured by DuPont), relatively large in pyrolysis temperature, and a high chemical stability is proved.

Examples 3, 4, and Comparative Examples 2

Polymer electrolyte membranes of Examples 1, 2 and the Nafion 112 membrane (trademark) as Comparative Example 1 are assembled in fuel cells, and the characteristic is evaluated as follows.

<Assembling of Single Cell>

At the anode side of the cast membranes (polymer electrolyte membranes) of Examples 1, 2 and the Nafion 112 membrane of Comparative example 1, the platinum-ruthenium electrode, carbon powder, and carbon paper (diffusion layer) were heated and compressed, and at the cathode side, the platinum catalyst, carbon powder, and carbon paper (diffusion layer) were heated and compressed, and thereby a single cell (electrode area 5 cm²) was assembled. The catalyst carrying amount was 2.2 mg/cm² at the anode side, and 14 mg/cm² at the cathode side. At both sides of the single cells, a carbon separator having a serpentine passage and a current collector were disposed in this sequence and fitted in, and tightened by bolts, and thereby three single cells for evaluation were prepared.

The obtained single cells of Examples 3, 4 and Comparative Example 2 were installed in the fuel cell evaluation device. An aqueous methanol solution (fuel) of 5 wt % concentration was sent to the anode side at flow rate of 7 mL/min, and air was supplied to the cathode side of each single cell at flow rate of 14 mL/min. At temperature of 50° C. of each single cell, current-voltage curve was inspected. Results are shown in FIG. 3.

Figure 3:
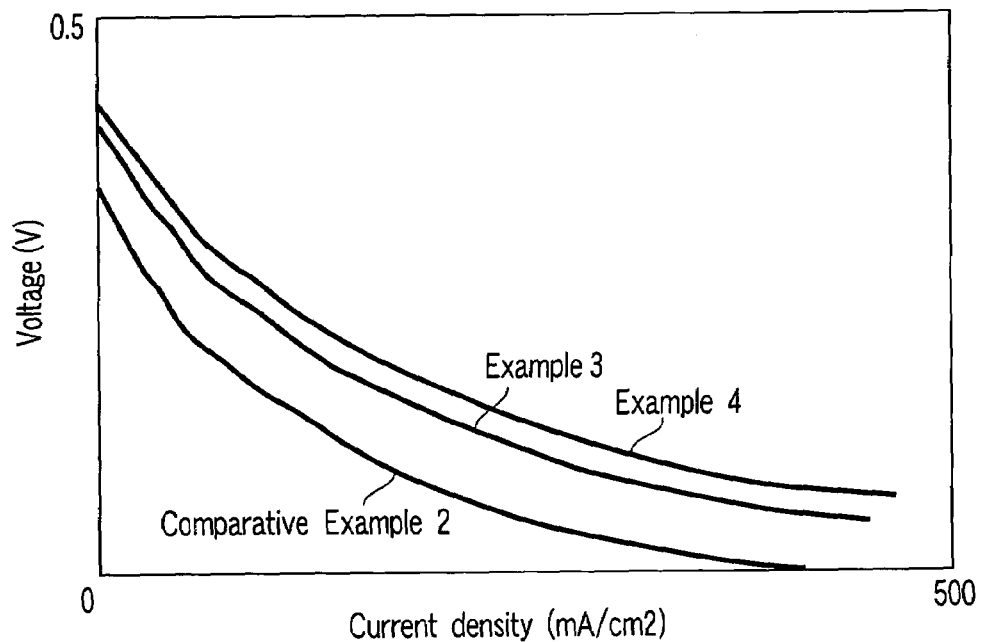
FIG. 3 is a current-voltage curve at 50° C. of a single cell in Examples 3 and 4 and Comparative example 2.

As is clear from FIG. 3, the single cells of Examples 3, 4 in which the polymer electrolyte membranes of Examples 1 and 2 have been assembled were high in current-voltage characteristic and enhanced in output characteristic, as compared with the single cell of Comparative Example 2 in which the Nafion 112 membrane (trademark) has been assembled.

At the anode side of the similar single cells of Examples 3, 4 and Comparative example 2, an aqueous methanol solution (fuel) of 5 wt % concentration was sent at flow rate of 7 mL/min, air was supplied to the cathode side at flow rate of 14 mL/min, cells were operated for 500 hours at 8 hours a day at temperature of 50° C. while keeping the current density constant at 300 mA/cm², and potential changes were observed. Results are shown in FIG. 4.

Figure 4:
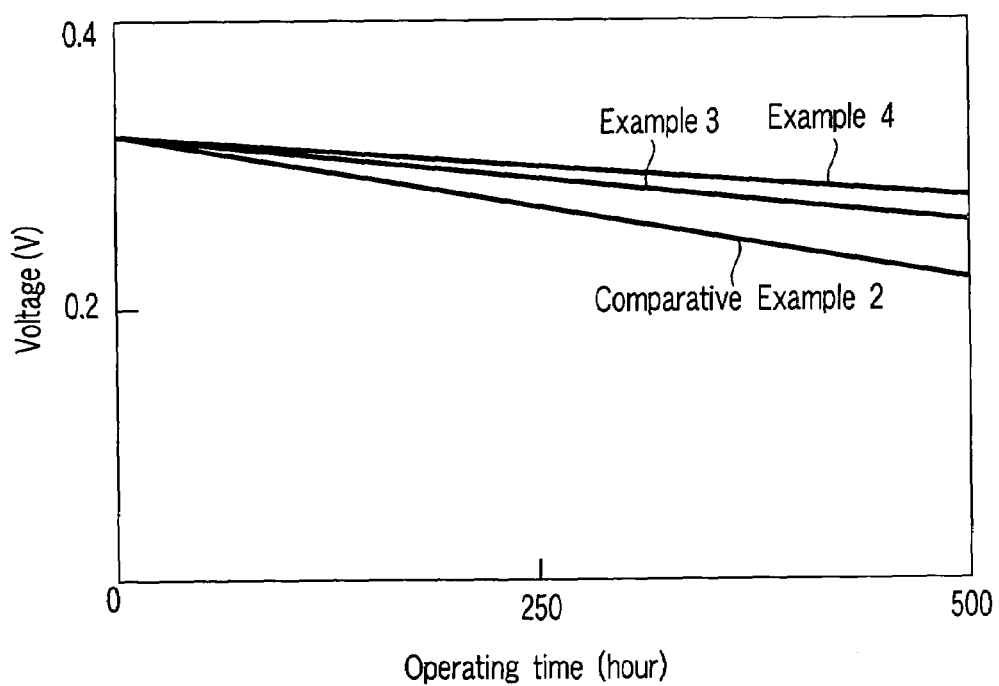
FIG. 4 shows voltage changes of a single cell for evaluation operation for a long period while maintaining a specific current density in Examples 3 and 4 and Comparative example 2.

As is clear from FIG. 4, the single cells of Examples 3, 4 in which the polymer electrolyte membranes of Examples 1 and 2 have been assembled were merely 16.5% and 14.2% respectively in potential changes in 500 hours, and were proved to maintain a high potential holding rate even after a long period of operation and to generate power at high reliability, as compared with the single cell of Comparative Example 2 having assembled therein the Nafion 112 membrane (trademark) showing 24.7%.

While certain embodiments of the inventions have been described, these embodiments have been presented by way of example only, and are not intended to limit the scope of the inventions. Indeed, the novel methods and systems, described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A polymer electrolyte medium represented by the following general formula (I):

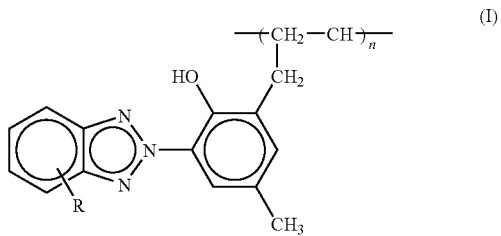

where R is sulfonic acid or phosphoric acid, and n is an integer from 50 to 8000.

2. The polymer electrolyte medium of claim 1, wherein n of the general formula (I) is from 300 to 4000.

3. A direct methanol fuel cell comprising a single cell including an anode to which an aqueous methanol solution is supplied, a cathode to which an oxidizer is supplied, and a polymer electrolyte medium interposed between the anode and the cathode, wherein the polymer electrolyte medium is represented by the following general formula (I):

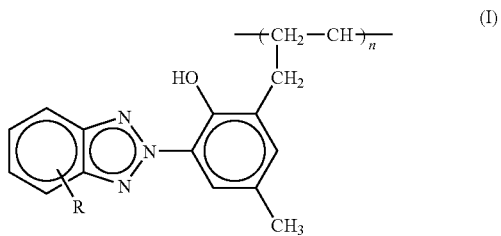

where R is sulfonic acid or phosphoric acid, and n is an integer from 1 to 8000.

4. The fuel cell of claim 3, wherein n of the general formula (I) is from 50 to 8000.

5. The fuel cell of claim 3, wherein n of the general formula (I) is from 300 to 4000.

* * * * *